United States Patent
Kaksonen (10) Patent No.: US 8,869,110 B2
(45) Date of Patent: Oct. 21, 2014

(54) METHOD AND ARRANGEMENT FOR TEST CASE CREATION

(75) Inventor: Rauli Kaksonen, Oulu (FI)

(73) Assignee: Codenomicon Oy, Oulu (FI)

( * ) Notice: Subject to any disclaimer, the term of this patent is extended or adjusted under 35 U.S.C. 154(b) by 1083 days.

(21) Appl. No.: 12/378,048

(22) Filed: Feb. 10, 2009

(65) Prior Publication Data

US 2009/0204591 A1    Aug. 13, 2009

(30) Foreign Application Priority Data

Feb. 11, 2008  (FI) ...................................... 20080095

(51) Int. Cl.
*G06F 9/44* (2006.01)
*G06F 17/30* (2006.01)
*G06F 7/00* (2006.01)
*G06F 11/36* (2006.01)

(52) U.S. Cl.
CPC ................................ *G06F 11/3684* (2013.01)
USPC ............ 717/124; 707/696; 707/711; 707/741

(58) Field of Classification Search
USPC .............................. 714/38, 741; 717/124, 125
See application file for complete search history.

(56) References Cited

U.S. PATENT DOCUMENTS

| | | | |
|---|---|---|---|
| 5,542,043 A * | 7/1996 | Cohen et al. ..................... 714/32 |
| 7,478,365 B2 * | 1/2009 | West et al. ..................... 717/124 |
| 2006/0116989 A1 * | 6/2006 | Bellamkonda et al. ........... 707/3 |
| 2009/0164975 A1 * | 6/2009 | Natanov et al. ................ 717/127 |

* cited by examiner

*Primary Examiner* — Sangwoo Ahn
(74) *Attorney, Agent, or Firm* — Ober, Kaler, Grimes & Shriver; Royal W. Craig (57) ABSTRACT

The invention concerns a method for assigning a value to at least one data item of a test case instance. The invention is characterized in that the method comprises steps of selecting an input data item from a test design library, the library comprising a plurality of input data items and information about semantics and/or data type of the input data items and assigning the selected input data item as a value of data item of the test case instance. Also an arrangement and a computer readable media comprising a computer executable program are disclosed.

14 Claims, 4 Drawing Sheets

METHOD AND ARRANGEMENT FOR TEST CASE CREATION

CROSS-REFERENCE TO RELATED APPLICATION

The present application derives priority from Finnish Application Number FI 20080095, filed Feb. 11, 2008, the disclosure of which is incorporated by reference herein in its entirety.

BACKGROUND OF THE INVENTION

1. Field of the Invention

The present disclosure relates to a method and arrangement for software testing.

2. Description of the Background

"Fuzzing" or robustness testing, is a technique for finding security and reliability flaws in software. Sending random characters to a program is the original and simplest form of software fuzzing, and is called simple or generic fuzzing. Current state-of-the-art robustness testing tools are based either manually placed "anomalies", e.g. carefully chosen erroneous and/or unexpected field values, or random fuzzing of protocol fields. Fuzzing is a black-box technique where the unexpected and/or erroneous values are formatted according to a protocol, e.g. HTTP fuzzers test HTTP servers over TCP connections.

Some fuzzers send entirely random data, but others requires only certain portions of the data to be fuzzed. In the latter case it is possible to manually define parameters for the fuzzed data, or valid portions of the otherwise fuzzed data. Also, it is often possible to provide data for valid message or messages which are used as basis of the fuzzing. Advanced frameworks are extendable to allow new test case types to be introduced and then used in the test case generation.

For example, patent application WO2005/071545 discloses a method and system for rule-based generation of automation test scripts from abstract test case representation.

U.S. Pat. No. 7,278,061 discloses a system for building packets of data for testing a communication network. The system comprises a component which describes one or more protocols by providing one or more rules which are used to build the packet of test data.

The problem with the foregoing and other current approaches is that the tester of the fuzzer framework must have a deep knowledge of the framework and of the tested protocol. Only an expert of the fuzzing framework and the used protocol can tune the test generation process. Thus a method that simplifies the process of creating test case instances for various purposes is desired.

SUMMARY OF THE INVENTION

Accordingly, the present disclosure has been made to solve the above problems occurring in the prior art, and it is an object of the present disclosure to provide a method and arrangement for flexible test case creation and customization utilizing data type and/or semantic information (e.g. length and checksum calculations, encryption or information about the use of the data).

In one general aspect of the present disclosure, the invention comprises a method for constructing instance data of test cases using data of a test design library. The method and arrangement may also facilitate configuring and tuning the resulting test cases.

The method may be implemented e.g. as a test case generation process that utilizes the model of the tested protocol, valid data, and test design library to produce test cases. This new method may provide benefits for e.g. test case efficiency and enables test customization.

The protocol model may e.g. describe the syntax of the protocol messages and message sequences. The model may be defined by various formal notations known in the art, such as ASN.1, ABNF and XML. The protocol model may comprise information describing the actual semantic meaning and/or data type of value of data items of a test case instance.

The protocol model may also contain (semantic) dependency information about model element. For example, a length field may be calculated using payload data. This may be achieved by rules, which perform this calculation.

The test design library contains data items associated to design keys, which comprise data type information and/or information about semantic meaning of the data item. A test case may be made up of valid data and possibly from a data item or items from the design library. The items, if any, from design library are selected by the design keys, that is, by data type information and/or semantic information of the model and/or valid data elements.

The sent messages of a test must have concrete content in them, i.e. values for the actual data items (e.g. bits, bytes and strings) which are sent in the messages of the protocol. This is called the test case instance data. The test case instances may then be executed e.g. in a testing arrangement comprising e.g. a tester computer and a system under test (SUT) or device under test (DUT).

Semantic information may be available through analysis of the protocol model. Semantic information may provide important information for the test case design. The semantic information of the protocol model may be used for selecting data items from the test design library for the test case instances.

Valid data of a test case may be provided such that it matches the operating profile of the tested environment. For example, when testing HTTP server the valid data may look like a typical request received by the server in normal operation. Valid data may be specified for example by a data file or captured network traffic. It may be also randomly generated or it may use default values from e.g. the protocol model.

Test design library comprises design keys and test designs. A test design may be identified by a design key. A design key may comprise e.g. a data type (int-8, text-field, etc.) and/or a label (semantic information, e.g. a user name, length field, etc.). A single design key may be associated with a plurality of data item values. A test design may thus comprise different data item values to try. These data item values may be directly defined as bits, octets, integers, strings, etc. to try. Also, the data item values may contain lengths of the tested elements, different encodings to apply, etc. abstract values. Values may be valid and expected in terms of the protocol and context, or unexpected values or even erroneous values or any combinations of these.

An aspect of the invention is a computer executable method for assigning a value to at least one data item of a test case instance, characterized in that the method comprises the step of selecting an input data item from a test design library, the library comprising a plurality of input data items and information about semantics and/or data type of the input data items and the step of assigning the selected input data item as a value of a data item of the test case instance. The method may further comprise step of selecting said test case and reading the structure of said test case from a protocol model, the model comprising test case information and data type and/or semantic information of data items of said test case.

In an embodiment, the test case may be selected from the protocol model for execution based on the data type and/or semantic information of its data item.

In an embodiment, the method may comprise the step of specifying from the protocol model at least one search criterion comprising data type and/or semantic information to be used for the selection of the input data item from the design library for the test case instance.

The method may still yet further comprise a step of selecting from the test design library the value of the data item for the test case instance using the information about data type and/or semantics of said input data item.

The method may further also comprise a step of assigning a random value to at least one data item value of said test case instance.

The method may further comprise steps of calculating a hash value of said test case instance and of a second test case instance, comparing the hash values to identify a duplicate test case instance and removing a duplicate test case instance.

The invention may also concern a method that is characterized in that an existing test case is altered using data read from said test design library.

The method may further comprise the step of specifying at least one search criterion comprising data type and/or semantic information to be used for said selection of said input data item.

Another aspect of the invention is an arrangement for assigning a value to at least one data item of a test case instance. The arrangement is characterized in that it comprises means for selecting an input data item from a test design library, the library comprising a plurality of input data items and information about semantics and/or data type of the input data items and means for assigning the selected input data item as a value of data item of the test case instance.

Yet another aspect of the invention is a computer readable media comprising computer executable software program code for assigning a value to at least one data item of a test case instance. The software program is characterized in that it comprises computer executable code for selecting an input data item from a test design library, the library comprising a plurality of input data items and information about semantics and/or data type of the input data items and computer executable code for assigning the selected input data item as a value of data item of the test case instance.

Some embodiments of the invention are described herein, and further applications and adaptations of the invention will be apparent to those of ordinary skill in the art.

DETAILED DESCRIPTION

Figure 1:
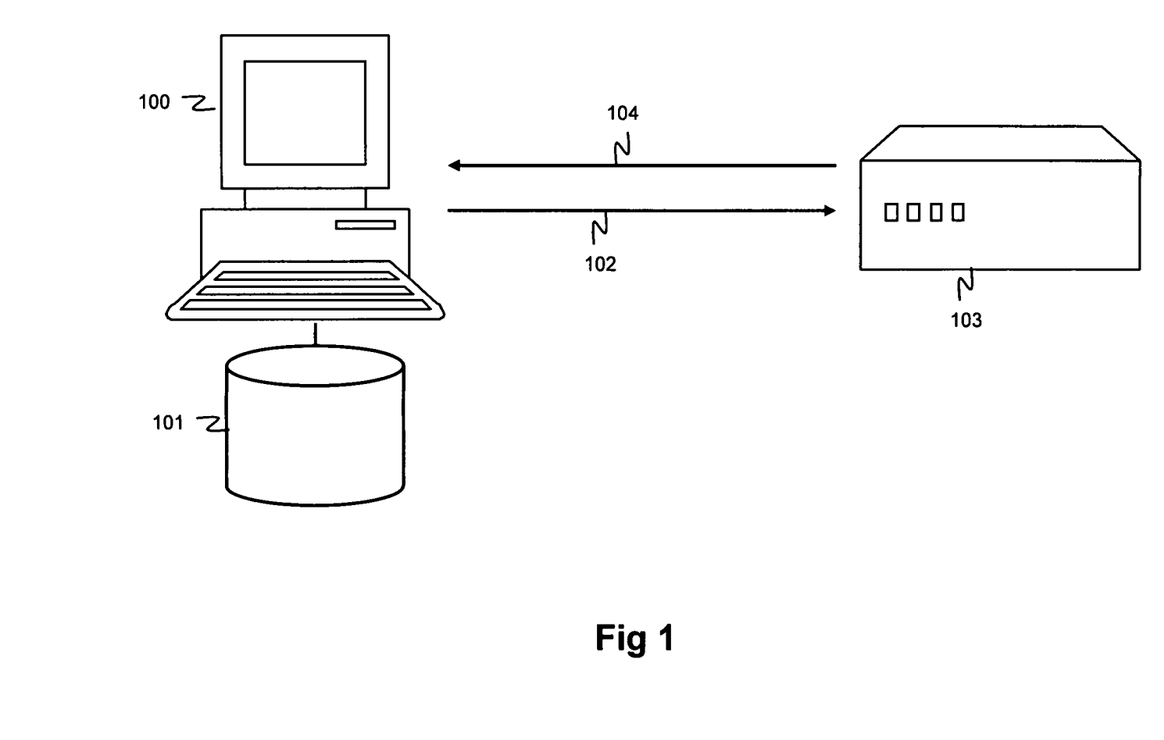
FIG. 1 shows an exemplary arrangement of an embodiment of the present invention.

FIG. 1 shows an exemplary testing arrangement according to an embodiment of the present invention. The arrangement comprises a tester computer 100 which has access to a data repository 101. The computer 100 may be any suitable computer comprising a processor and some memory, e.g. a PC or a server computer. The computer 100 runs software including a test case assembly process module that assembles test cases by calling on the data repository 101, and by accessing thereon a plurality of sources of information including 1) protocol model information; 2) valid test data (e.g. captured network traffic); and 3) test design information. The tester computer 100 is arranged to construct test messages using the repository 101 information and send the test messages 102 to a system under test (SUT) 103 (or a device under test, DUT). The system under test 103 is arranged to send response messages back to the tester computer 100. The messaging may use e.g. any suitable networking means, e.g. wireline or wireless networks or other suitable communication means, e.g. Ethernet network, WLAN, USB cable, serial connection, or Bluetooth connection.

Figure 2:
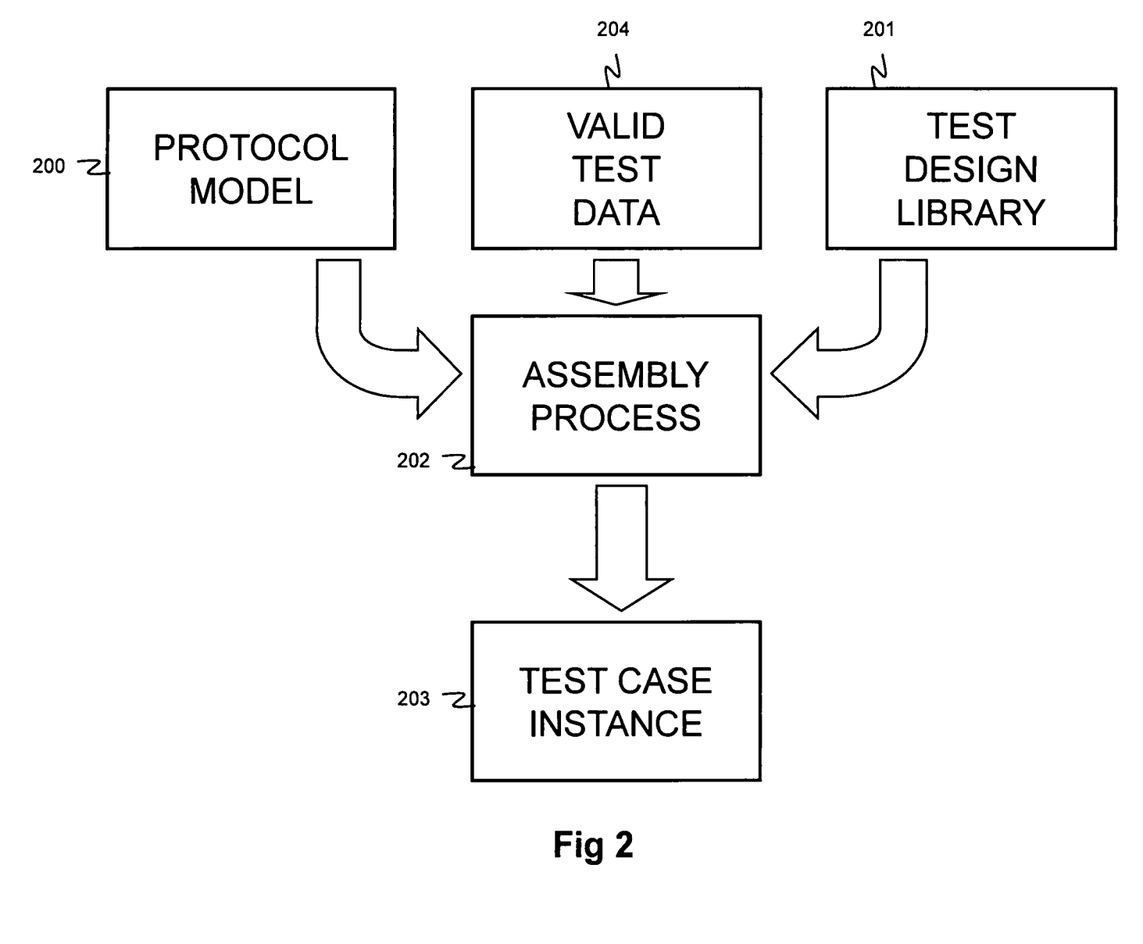
FIG. 2 shows a high-level process diagram of an embodiment of the present invention.

FIG. 2 depicts a high level process diagram of the test case assembly process module 202 according to an embodiment of the invention. Test case instances 203 are assembled by the test case assembly process module 202, which uses the information available in the protocol model 200, the source of valid test data 204 (e.g. captured network traffic) and test design library 201 to do so.

The protocol model 200 describes fuzzing protocol syntax including the syntax of the protocol messages and message sequences (for example, character string, numeric string, integer, byte array, or bit array, etc.). A protocol message format typically comprises a plurality of elements (data items) that need to be assigned a value according to the syntax and/or semantic meaning of the element. For example, the syntax of an IP address may be defined in a protocol model in a following manner:

ip-address=num '.' num '.' num '.' num
num=1 ... 3('0'-'9')

A valid value of the element that is in accordance with the above definition may be e.g. the following:

an-ip-address=ip-address: '127.0.0.1'

The test case assembly process module 202 analyzes data obtained from the protocol model 200, and captures the protocol message format, and determines the semantic meaning, data type, and/or context data of the model elements obtained there from. It then uses the protocol message format information to extract test designs from the test design library 201. The test design library 201 is a library of a plurality of test designs in each case keyed (or indexed) according to the semantic meaning, data type, and/or context data for which those test designs are appropriate. Thus, the test case assembly process module 202 compiles a test case instance by reading element(s) (data items) from protocol model 200, analyzing the protocol message format (data type information and/or semantic information related to the data items), querying the test design library 201 for input data item(s) that are keyed (indexed) to the data type information and/or semantic information, and finally by assigning valid values from valid test data 204 to one or more data items of the test case instance in accordance with the test design retrieved from test design library 201 to provide value to at least one data item of the test case instance.

To determine the data type (syntax), the test case assembly process module 202 analyzes data obtained from the protocol model 200 to ascertain, for example, any of the following data types:

textual data
binary data
unicode text fixed-length integer value (e.g. 8-bit integer, 32-bit integer)
ipv4-address
ipv6-address
ethernet-address
Large integer values (e.g. RSA algorithm or Diffie-Hellman algorithm).

To capture the semantic meaning, the test case assembly process module 202 analyzes data obtained from the protocol model 200 to ascertain, for example, whether the data is any of the following semantic forms:
repeating element
alternative values for an element
variable-length element
text delimiter
text whitespace
text number
quoted text
text in braces
text ipv4-address
text ipv6-address
text ethernet-address
user name
password
text URL
length field over a payload
checksum over a payload
XML data
ASN.1/BER encoded data
ASN.1/PER encoded data
URL encoded data
potential subject to specific kind of programming error, vulnerability or attack (e.g. underflow or overflow vulnerability)
payment information Semantic meaning is preferably assigned to a data item using an automatic analysis process. However, in some cases, a test designer may also augment this analysis by manually assigning semantic meanings to those protocol elements where automatic analysis may not work well enough.

In capturing the context, the test case assembly process module 202 keeps track of context data while it traverses the elements. Context data may be the allowed content length in a field, encoding used in a field, etc. For example an UDP datagram may only contain 65535 octets of data, so any tested element longer than this may not make any sense.

Given the data type and syntax of the protocol messages and message sequences from the protocol model 200 (typically a plurality of data elements that need to be assigned a value according to the syntax, and the semantic meaning/context of the protocol messages and message sequences from the protocol model 200, the test case assembly process module 202 can then cross-reference that data to the keyed test designs in test design library 201 to retrieve appropriate test design that are keyed to that data. This way, semantically and/or otherwise desired input data item(s) are retrieved from the test design library 201 for compiling each new test case instance 203.

The test design library 201 contains a plurality of test designs keyed by data type and/or semantic meaning of an element. Each test design contains values to try. The values may be prioritized. Keys may be identifiers for such data types as '16-bit integer" or UTF-8 string or such semantic names as 'user name' or 'variable length element' as shown above.

The design library 201 may contain, for example, the following kind of definitions for key "ip-address":
All zeroes: 0.0.0.0
Private use: 10.0.0.0
Invalid x.x.x.x
Invalid: .

The "IP Address" is the data type part of the key, while "Invalid", "Private use" and "All zeroes" further specify data items to be fetched from the design library. The design library for "ip-address" data type may also contain, for example, definitions for overflow and underflow testing. Thus, the semantic information may contain information usable for e.g. certain types of robustness testing, e.g. overflow and/or underflow attack testing. In overflow testing the tested element is padded with some defined value, duplicate or replaced with some long element. For example:
Overflow by padding: 127.0.0.11111
Overflow by padding: 127.0.0.122222222
Overflow by repeat: 127.0.0.1127.0.0.1
Overflow by repeat: 127.0.0.1127.0.0.1127.0.0.1127.0.0.1
Overflow by replace: 3333333333333333333
Overflow by replace: 44444444444444444444444444444444

In underflow testing the value is cut short, for example:
Underflow: 0.0.0.
Underflow: 0.0.0
Underflow: 0.0.
Underflow: 0.
Underflow: 0

One skilled in the art will understand that the above list is just an example of the kind of values which can be stored in the design library 201 and accessed by keys containing data type and/or semantic value. Further, as an example, the "keys" may be database fields, wherein the test design library 201 comprises a database table stored on the repository 101, said database table comprising records having dedicated key fields containing identifiers for data type and/or semantic value.

In addition, the design library 201 may contain semantic information of the test designs, for example, in the form of metadata. The metadata may for example indicate that the data of a test design is related to e.g. common weakness enumeration codes CWE, common vulnerability enumerations CVE, the test purpose, etc. CWE and CVE are industry standard definitions and classification for software program errors and weaknesses. The metadata may also contain characterization of the applied values, such as overflow, underflow, integer-value, etc.

The protocol model 200 may comprise information describing the actual semantic meaning and/or data type of value of data items of the test case. For example, e.g. string 'john' is a user name and it is defined as a string of 1-100 characters from hexadecimal range 0x20 to 0x7f. The "user name" information indicates a semantic meaning of the data item and "string of 1-100 characters from range 0x20 to 0x7f" indicates data type of the data item.

The protocol model 200 may also contain dependency information about an element of the protocol model, such as length field is calculated over payload. This may be achieved by rules, which perform this calculation. For example in following a rule marked with !p calculates the length of payload string as 8-bit integer:
data-block=!p:length uint8 !p:payload string
string=0 . . . n(uint8)
uint8=0x00-0xff Rules may be needed to generate valid protocol messages even when different elements are tried in the test cases. For example, in above example we need to calculate different length field value, if the length of the string changes. For example, payload of length one and payload of length eight:

data-block=!p:length 0x01 !p:payload 'a'
data-block=!p:length 0x08 !p:payload 'aaaaaaaa'

Further, understanding these kinds of relationships and using them as keys to the design library 201 makes it possible to create effective test cases. For example, it becomes possible to simultaneously put in an invalid or unexpected length field value and payload value.

The test case assembly process module 202 may be configured so that it allows manual intervention when creating the test case instances according to a protocol model 200 and test design library 201. For example, a tester may want to directly try some particular value in some tested message. For this, the tester may be provided with a possibility to change the tested value of an existing test case e.g. manually or using data from test design library 201 and thus create a new test case based on the existing test case. Ideally this is implemented by presenting a test designer with a visual representation of the tested message where the test value is highlighted. The tester may point this test case and request a new test case where the test value is changed to value or her choice. Further, the tester may choose to merge several test cases such as the tested elements of all of those test cases have their values in a single case, if possible.

A test case generation approach may lead into a number of identical, thus redundant, test cases. For example, one test case may try integer value zero and another test case may try empty null-terminated string to the same location. Since integer value zero may be encoded identically to empty null-terminated string. One embodiment of the invention optimizes the resulting test suite by removing duplicates by calculating a hash code for each resulting test case instance and removing any subsequent test case instances with an identical hash code.

Figure 3:
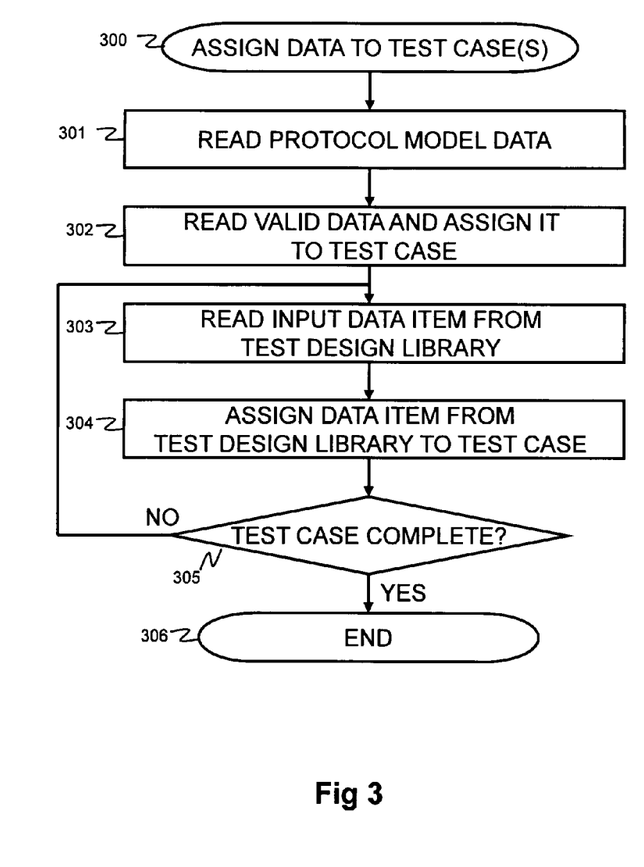
FIG. 3 shows a more detailed example of assembling a test case according to an embodiment of the present invention.

FIG. 3 is a flow diagram illustrating the exemplary steps of the process 300 employed by the assembly process module 202 in assigning data to at least one test case instance according to an embodiment of the present invention. First, data describing a test case comprising at least one element (data item) is read at step 301 from protocol model (200 in FIG. 2). The protocol model data may comprise, e.g., data type information and/or semantic information related to the elements (data items) of a test case. Next, at step 302, valid data is read from a suitable source of valid data (valid test data 204 in FIG. 2) to assign value(s) to at least one data item of the test case. The data type and/or semantic information obtained from the protocol model 200 may be utilized as selection criteria when querying at step 303 input data item(s) from test design library (201 in FIG. 2). Thus, semantically and/or otherwise proper input data item(s) is retrieved from the test design library 201 for the new test case instance (203 in FIG. 2). The retrieved input data item, that may for example represent an anomaly in the test case, is then assigned 304 to be a value of a data item (element) of a test case instance.

If the assembly of a (set of) test case(s) is complete at step 305, the process ends. Otherwise the process returns to step 303 and additional data from design library 201 is read, preferably utilizing the data type and/or semantic information obtained from the protocol model 200, and assigned to be the value of a data item in a test case instance. As part of e.g. the step of assigning a data item at step 304 from a test design library 201, a new test case instance may be created which may be e.g. a copy of a previously created test case instance. Thus, repeating the steps 303 and 304 of the process 300 may result as a plurality of test case instances where value of e.g. a single data item is varied e.g. using data read from the test design library. On the other hand, repeating the steps 303 and 304 of the process 300 may produce a single test case instance where values of plurality of data items of the test case are selected from the test design library. Naturally, the process 300 may also result as a plurality of test cases which each have a plurality of data item values selected from the test design library.

Figure 4:
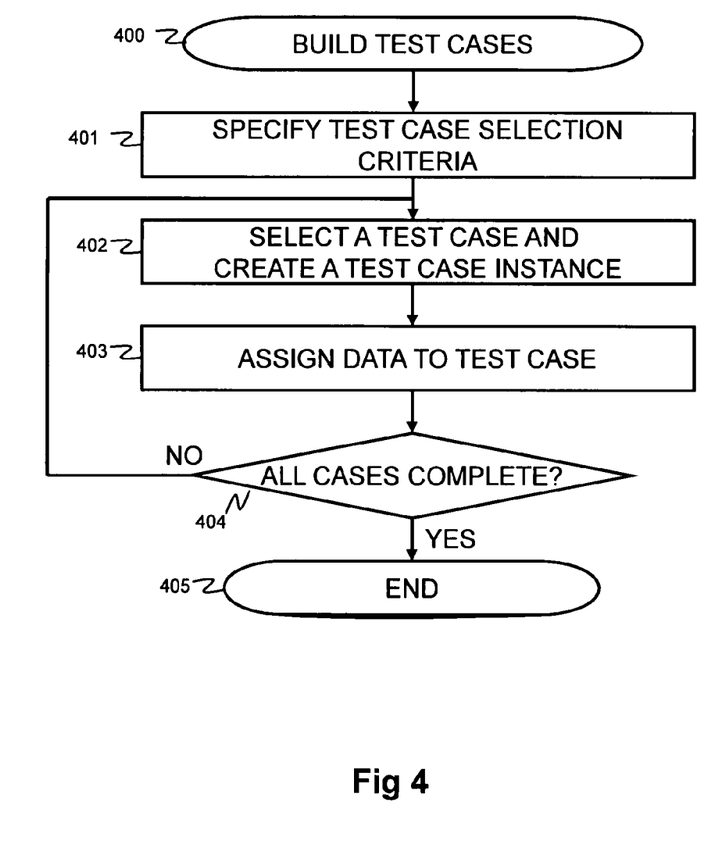
FIG. 4 shows an example of assembling test cases based on data type and/or semantic information related to test cases and test design library according to an embodiment of the present invention.

FIG. 4 depicts an exemplary method 400 of building test case instances according to an embodiment of the present invention. First, some test case selection criteria are specified at step 401. The criteria may for example specify that test cases containing data items that are potentially vulnerable to underflow and/or overflow attacks, need to be selected for testing. The information about potential vulnerability is semantic information associated with the data items of the test cases. Then, a test case meeting the selection criteria is selected at step 402 and a test case instance is created. Then, data is assigned to the test case in step 403. One exemplary process of assigning data to the test case instance is shown in FIG. 3. When selecting data values for the data items of the test case from the test design library, underflow and overflow data of suitable type is preferably selected. If there are other test cases 404 that meet the selection criteria specified in step 401, another test case is selected 402 from the protocol model and a new test case instance is created. If there are no more test cases meeting the specified selection criteria, the process of building test cases ends 405.

Once a test case instance is completed, it may be executed directly or it may be stored for later execution. Duplicates may be removed from the set of test cases before executing the test cases. After execution, the results may be analyzed.

In some embodiments, test cases may be created first without executing them to check which cases are duplicates. This way it is possible to identify how many non-duplicate test cases have been created. After that when executing the test, only those test cases are used which are not duplicates.

The various aspects of the invention are advantageous over prior art because they allows creation of the protocol model without understanding of the testing goals or efficient test cases. The different testing goals (e.g. overflow and underflow testing) are easily achieved e.g. by utilizing the data type and semantic information of the protocol model when selecting test cases from the protocol model and/or data of the test case instances from the design library. The design library may be separately maintained from the protocol models, such that it evolves into a set of effective designs. The design library can be easily used in multiple different protocol models with common characteristics.

Sometimes it may be advantageous to trim down the number of test cases, e.g. due to limited time available for testing. This may be achieved e.g. by limiting the number of input data items read from the test design library. For example, the tester may choose to execute test cases containing data items of certain data types only or data items having certain semantic meaning.

Once tests have been run and some results have been obtained, the test design data which have produced the most effective test cases may be marked or prioritized. This gives the preference in subsequent test suites. Prioritization may also be based e.g. on the following ways:

Common Vulnerability Scoring System CVSS score
Higher value for messages early in the protocol message sequence
Higher values for messages which are exchanged before authentication
Higher values for unencrypted plain text elements
Higher values for textual data, which is easier to edit than binary values
Higher value for critical data, such as payment information Other heuristics The calculated value is applied to test designs and/or protocol model so that test cases with higher value receive higher priority. A heuristics may e.g. put higher priority for test cases in the first messages in a sequence which are exchanged without authenticating the user, since a flaw here is easier to exploit anonymously. For example, when in a hurry, only high-priority test cases may be executed. Prioritization can also be used in test result analysis, a bug found by higher priority test case may be more critical than a bug found by lower priority test case.

For this, the tester (person) may request a lower number of test cases than which is the default number of test cases generated. The test case generation system picks the test cases which have higher priority. Also, the tester may request a higher number of test cases than the default. For this the design library may contain additional design elements, which are only applied when extra test cases are desired. Also, overflows and underflows may be tested more thoroughly by using longer or shorter values, different values and/or more granular lengths.

One of the main benefits of this system is that the separation of concerns make possible to better tune tests to suit particular testing need. For example, the tester may limit testing e.g. to certain data types only, e.g. select to test only integer-elements or only user-names. Also, test cases may be selected based on e.g. the semantic metadata in the protocol model and test designs, e.g. "test only overflows and underflows". Such test may contain e.g. only test cases which contain data items having "subject to overflow or underflow" as semantic information according to the protocol model. Tester may also use the protocol model and or valid data to configure the test case generation. In some embodiments, test cases may only be generated for the first message or for a few first messages, for example. Test cases may also be configured to e.g. test only some other part of a protocol, e.g. Host-header of HTTP server, IP-header of ip-datagram. Also, the tester may use other criteria when configuring the test case generation, for example:

Test selected messages

Test some specific values, attributes, headers, elements, types, etc.

Test for selected common weakness enumeration CWE IDs

The selection may be preferably done by graphical user interface (GUI), where the protocol structure is visualized and tester may simply point and select portions to be included or excluded.

By combining control over number of test cases with selection of tested protocol parts tester may more effectively test only the portion of the protocol which needs more testing.

When customizing a test case, a tester may first define the valid data. For convenience, a default valid data may be provided for elements (data items) of the test case instance. Tester may provide the valid data by data file or it may be parsed from captured traffic, etc. Alternatively, an editor may be provided to create valid or invalid data.

The protocol model may not usually require modifications for particular test scenarios, if both the protocol model and the tested software conform to the protocol in question. However, in real world, conformance may not be perfect, so model changes may be required. For this, it may be possible to create model add-ons, which add, change or remove parts of the model. This add-on is a file which is read when the test case generation is performed. Add-on can be delivered more easily and with lesser testing than a new version of the whole model.

Also, add-ons can be create SUT or DUT specific configurations without need to have different protocol model versions for them.

Often tester wants to create a test case with some element or elements having a special value. It may be difficult to construct a proper outgoing message or message sequence to put the special value to meaningful message. A capability for tester to edit existing test cases may provide a solution to this problem.

A test case may be represented so that the element added or replaced in by a test design is visually highlighted and/or its location is given as a string. For example in below we have SSL2 Client Hello message with special session-id-data value highlighted by <<...>> (challenge data related to the message is omitted for brevity):

```
Location: client-hello.session-id-data
client-hello = (
    msg-client-hello: 0x01
    client-version: 0x0200
    cipher-specs-length: 0x0003
    session-id-length: 0x0006
    challenge-length: 0x0010
    cipher-specs-data: 0x010080
    session-id-data: << 0xffffffffffff >>
    challenge-data: ...
)
```

This results an outgoing message
0x01 0x02 0x00 0x00 0x03 0x00 0x06 0x00 0x10 0x01 0x0 00x80 0xff 0xff 0xff 0xff 0xff 0xff . . .

This may be customized by changing the highlighted value to e.g. 0x00. This results an outgoing message, where also the length field is changed due rule which calculates the length value:
0x01 0x02 0x00 0x00 0x03 0x00 0x01 0x00 0x10 0x01 0x00 0x80 0x0

Further, a tester could specify another test case to be merged with the above test case. For example, the following test case, which contains bad session-id-length value, could be merged with the previous one (value for session-id-data and challenge-data not shown for brevity):

```
Location: client-hello.session-id-data
client-hello = (
    msg-client-hello: 0x01
    client-version: 0x0200
    cipher-specs-length: 0x0003
    session-id-length: 0x0006
    challenge-length: << 0x0000 >>
    cipher-specs-data: 0x010080
    session-id-data: ...
    challenge-data: ...
)
```

This would result a merged test case:

```
client-hello = (
    msg-client-hello: 0x01
    client-version: 0x0200
    cipher-specs-length: 0x0003
    session-id-length: 0x0006
    challenge-length: << 0x0000 >>
    cipher-specs-data: 0x010080
    session-id-data: << 0x00 >>
    challenge-data: ...
)
```

The capability of customizing test cases with merging capability provides an intuitive way for tester to creating custom test cases. This is especially true if the test cases are put to tree-like structure according the hierarchy of the protocol, e.g. in case of SSL2 to a structure similar than used above. Using a GUI, the tester may traverse the tree hierarchy and pick the test cases to merge and edit.

Duplicate test case removal calculates a hash code for each test case or each outgoing message with a tested element in it. This hash code is compared with calculated hash code from previous test cases or already sent messages. If hash calculation shows that identical test case has already been created, then the test case can be discarded. Alternatively the representation of the test cases can be devised such as it is fast to compare test cases to each other without hash-code. On that case, duplicates can be removed e.g. by storing each test case or representation of a test case and looking for matches from the store. Duplicate test case removal can be done before any tests are executed or it can be performed before each individual test case or outgoing message during a test run.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singularly or in combination with other embodiment(s) and steps or elements from methods in accordance with the present invention can be executed or performed in any suitable order. Therefore, it will be understood that the appended claims are intended to cover all such modifications and embodiments, which would come within the spirit and scope of the present invention.

What is claimed is:

1. A software method for assigning a value to at least one data item of a test ease instance, comprising a plurality of machine-readable instructions stored on non-transitory computer readable storage medium for instructing a tester computer to carry out the steps of:
    selecting an input data item from a test design library, the library further comprising,
        a plurality of input data items each defining a predetermined test design,
        information about semantics and data type of the input data items associated with each of said plurality of input data items;
        each of said plurality of input data items including an index associating that input data item to said information about semantics and data type of that input data item, the index containing a key value, and wherein the indices of two or more input data items may share the same key value;
    assigning the selected input data item as a value of data item of the test case instance; and
    executing said test case instance with assigned data items by sending corresponding test messages from said tester computer to a system under test and receiving response messages at said tester computer from said system under test.

2. The method according to claim 1, further comprising a step of selecting a test case and reading a structure of said test case from a protocol model, said protocol model comprising test case information and one of data type and semantics information of data items of said test case.

3. The method according to claim 2, further comprising a step of specifying from said protocol model at least one search criterion comprising data type and semantic information to be used for said selection of said value of said data item from said design library for said test case instance.

4. The method according to claim 1, further comprising a step of selecting said value of said data item of said test case instance using said information about data type and/or semantics of said input data item.

5. The method according to claim 1, further comprising a step of assigning a random value to at least one said data item value of said test case instance.

6. The method according to claim 1, further comprising a step of removing a duplicate test case instance.

7. The method according to claim 6, further comprising a step of calculating a hash value of said test case instance and of a second test case instance and comparing the hash values to identify a duplicate test case instance.

8. The method according to claim 1, further comprising a step of specifying at least one search criterion including one of data type and semantic information to be used for said selection of said input data item from said design library.

9. The method according to claim 2, further comprising a step of specifying at least one search criterion comprising one of data type and semantic information to be used for said selection of said test case from said protocol model.

10. A method for generating fuzzing test case instances, comprising the steps of providing a system, wherein the system comprises a processor and a plurality of software modules resident on a non-transitory computer-readable storage medium, and wherein the plurality of software modules comprise:
    a protocol model comprising a protocol message format, and data items with type information and semantic information associated with said data items;
    a test design library comprising a plurality of test designs each including an index associating that test design to a particular type information, each index containing a key value wherein the indices of two or more test designs may share the same key value, and semantic information associated with said data items;
    valid test data; and
    a test case assembly process module for generating test cases in accordance with said protocol model, test design library and valid test data, compiling a test case by reading data items from said protocol model, and assigning valid values from said valid test data to one or more data items of a test case in accordance with the test design retrieved from test design library.

11. The method according to claim 10, wherein said test case assembly process module analyzes a protocol message format of said data items for type information and semantic information and queries the test design library for input data items that are keyed to the analyzed data type information and semantic information.

12. The method according to claim 1, wherein a test case instance is altered using data read from said test design library.

13. A system for assigning a value to at least one data item of a test case instance, said system comprising a processor and software stored on a non-transitory computer readable storage medium characterized by:
    a. means for selecting an input data item from a test design library wherein each input data item defining a predetermined test design, the library comprising a plurality of input data items and information about semantics and data type of the input data items, each of said plurality of input data items including an index associating that input data item to said information about semantics and data type of that input data item, each index containing a key value, and wherein the indices of two or more input data items may share the same key value;

b. means for assigning the selected input data item as a value of data item of the test case instance; and c. means for executing said test case instance with assigned data items by sending corresponding test messages from a tester computer to a system under test and receiving response messages at said tester computer from said system under test.

14. A non-transitory computer readable storage media comprising computer executable software program code stored thereon for assigning a value to at least one data item of a test ease instance, further characterized in that the media comprises computer executable code for:

a. selecting an input data item from a test design library, the library comprising a plurality of input data items each defining a predetermined test design and information about semantics and/or data type of the input data items, wherein each input data item includes an index associating that input data item to said information about semantics and data type of that input data item, the index containing a key value, and wherein the indices of two or more input data items may share the same key value; and b. assigning the selected input data item as a value of data item of the test case instance; and c. executing said test case instance with assigned data items by sending corresponding test messages from a tester computer to a system under test and receiving response messages at said tester computer from said system under test.

* * * * *